(12) United States Patent
Ori

(10) Patent No.: US 7,180,684 B1
(45) Date of Patent: Feb. 20, 2007

(54) ZOOM OPTICAL SYSTEM

(75) Inventor: Tetsuya Ori, Koshigaya (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/492,084

(22) Filed: Jul. 25, 2006

(30) Foreign Application Priority Data

Jul. 28, 2005 (JP) ............................ 2005-219296

(51) Int. Cl.
*G02B 15/14* (2006.01)
(52) U.S. Cl. ..................... 359/690; 359/684; 359/685
(58) Field of Classification Search ................ 359/684, 359/685, 689, 690, 693
See application file for complete search history.

(56) References Cited

U.S. PATENT DOCUMENTS

| | | | |
|---|---|---|---|
| 6,995,922 B2 | 2/2006 | Mihara et al. | |
| 7,068,429 B1* | 6/2006 | Ori | 359/557 |
| 7,110,186 B2* | 9/2006 | Sueyoshi | 359/676 |
| 2005/0007678 A1* | 1/2005 | Sueyoshi | 359/683 |
| 2006/0056048 A1* | 3/2006 | Sato et al. | 359/684 |
| 2006/0215277 A1* | 9/2006 | Sato | 359/687 |

FOREIGN PATENT DOCUMENTS

JP 2000-131610 5/2000

* cited by examiner

*Primary Examiner*—David N. Spector
(74) *Attorney, Agent, or Firm*—Arnold International; Jon W. Henry; Bruce Y. Arnold

(57) ABSTRACT

A zoom optical system includes three lens groups, arranged as follows from the object side: a first lens group having positive refractive power, a second lens group having negative refractive power, and a third lens group having positive refractive power. The first lens group includes, arranged as follows along the optical axis, a lens element having negative refractive power, a prism for bending the optical axis, and a lens element having positive refractive power. The second and third lens groups are movable along the optical axis for zooming with only the third lens group reversing its direction of movement along the optical axis during zooming from the wide-angle end to the telephoto end. The third lens group includes a stop, a cemented lens component, and at least one aspheric surface that may be made of plastic. The first lens group also includes at least one aspheric surface.

19 Claims, 4 Drawing Sheets

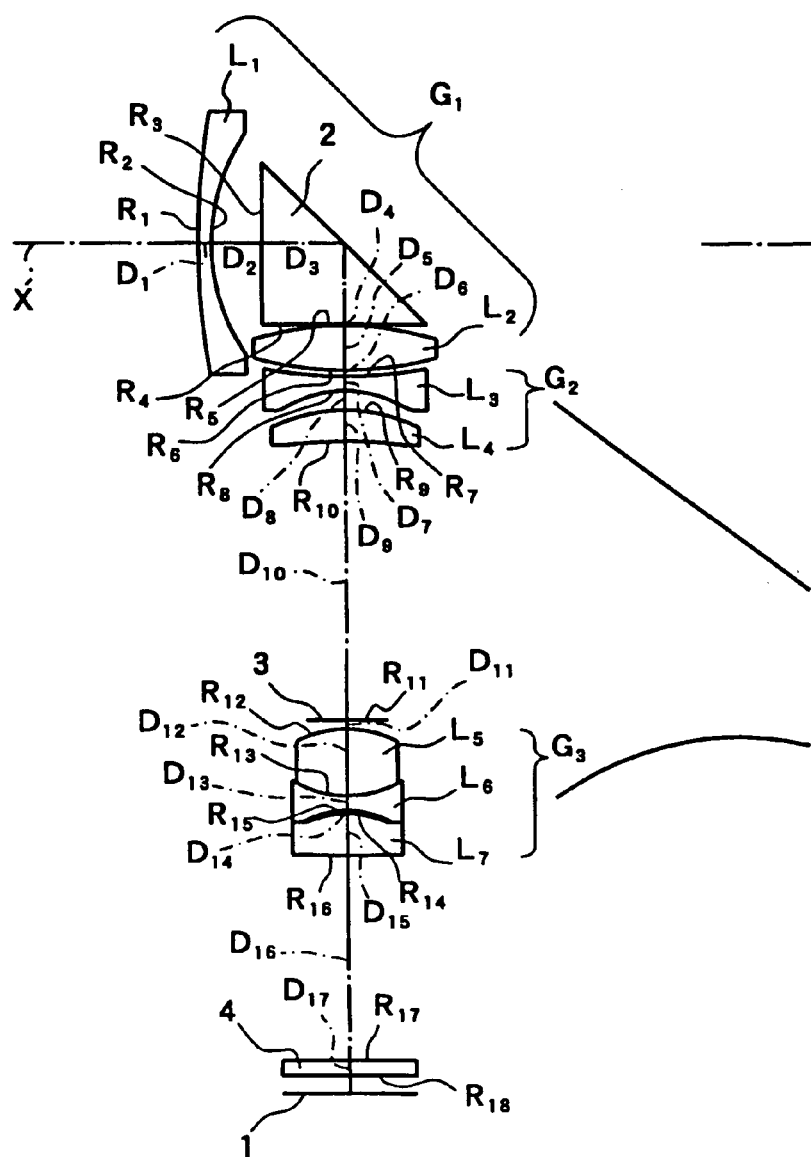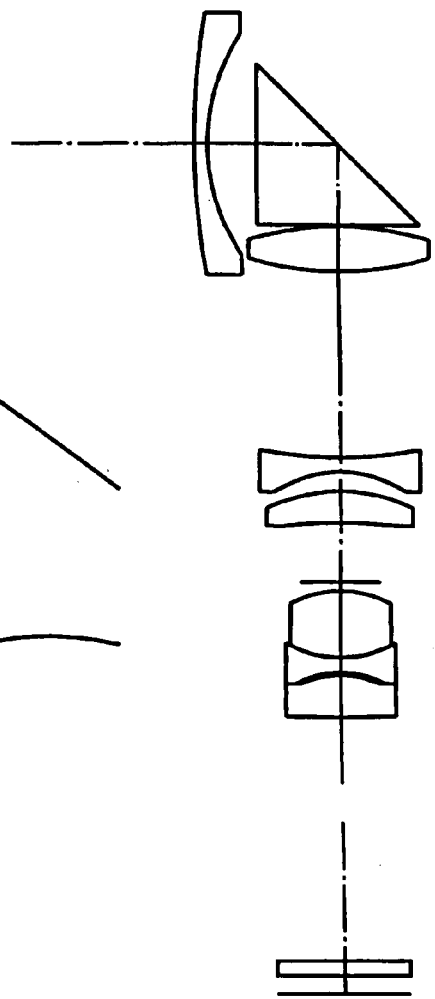
Fig. 1A
Fig. 1B

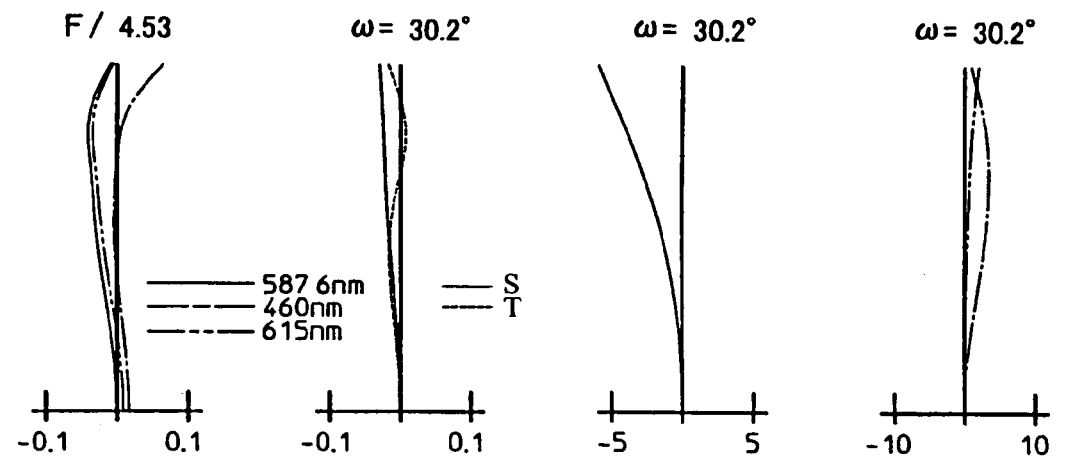
Spherical Aberration
Fig. 2A
Astigmatism
Fig. 2B
Distortion
Fig. 2C
Lateral Color
Fig. 2D
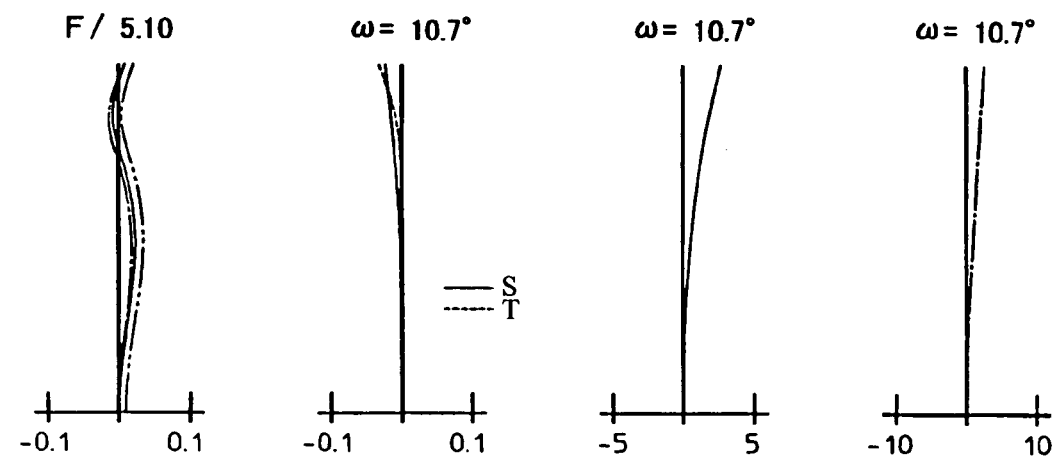
Spherical Aberration
Fig. 2E
Astigmatism
Fig. 2F
Distortion
Fig. 2G
Lateral Color
Fig. 2H

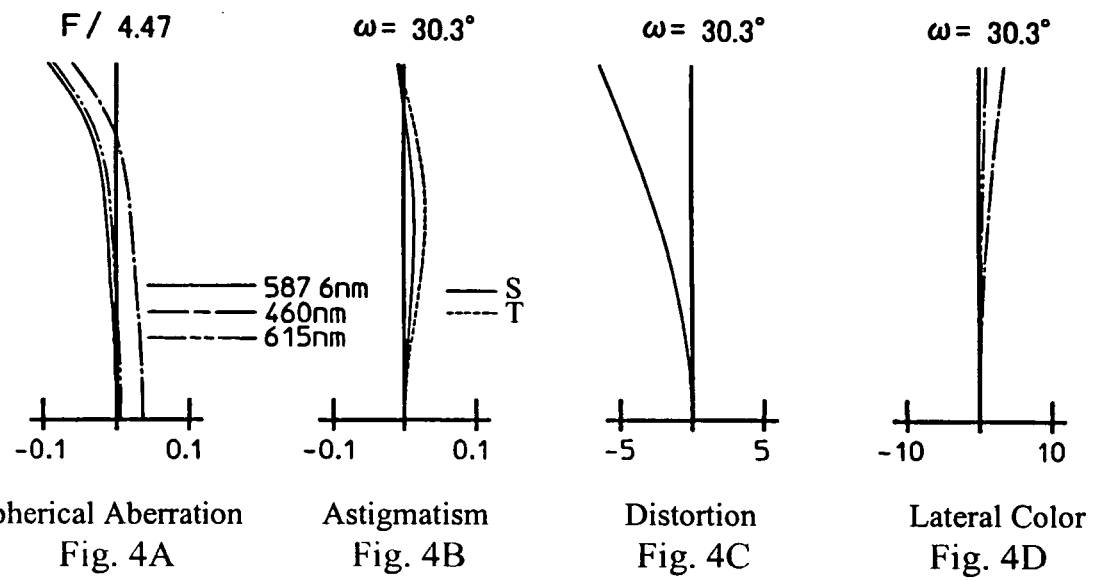
Spherical Aberration
Fig. 4A
Astigmatism
Fig. 4B
Distortion
Fig. 4C
Lateral Color
Fig. 4D
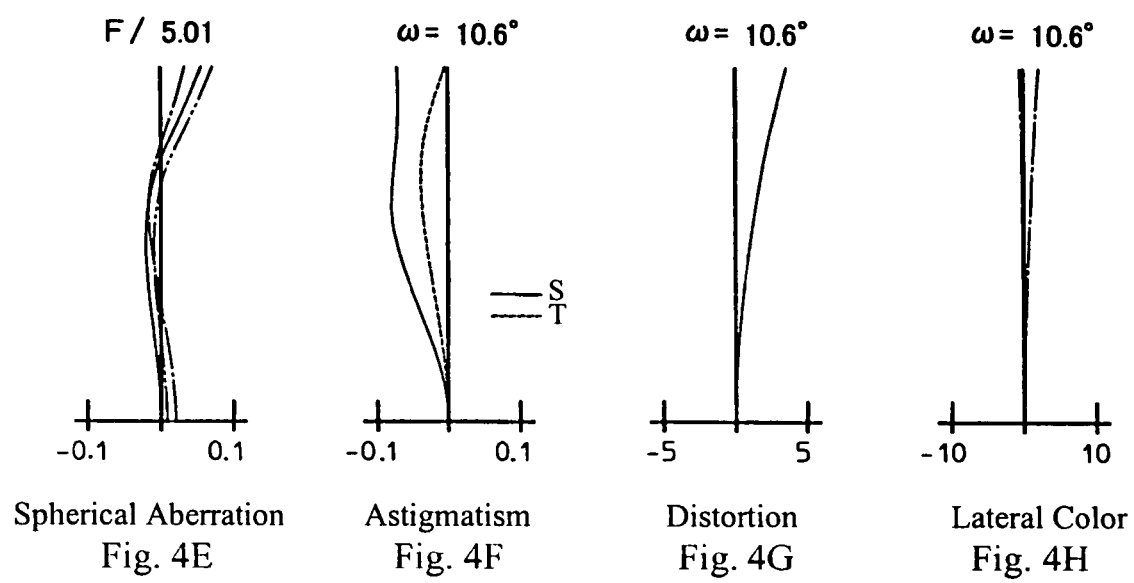
Spherical Aberration
Fig. 4E
Astigmatism
Fig. 4F
Distortion
Fig. 4G
Lateral Color
Fig. 4H

ZOOM OPTICAL SYSTEM

FIELD OF THE INVENTION

The present invention relates to a zoom optical system used in an image pickup device such as a portable telephone, a portable computer, or a similar device.

BACKGROUND OF THE INVENTION

Recently, in devices such as portable telephones and portable computers, picture image information is incorporated in an image pickup device. In an image recording or photographic optical system used in such an image pickup device, it is necessary to make the optical system lightweight and compact in order to obtain the desired portability. When the optical axis of an objective lens extends in the thickness direction of an image pickup device, a technique for reducing the thickness of the casing of the device has been developed that uses a prism to bend the optical axis of the optical system.

On the other hand, additional functionality is also desirable in image recording and photographic optical systems used in such image pickup devices, and image recording and photographic optical systems that include a zoom function have been proposed, for example, in Japanese Laid-Open Patent Application 2004-264585 and Japanese Laid-Open Patent Application 2000-131610.

However, in Japanese Laid-Open Patent Application 2004-264585, in the case of forming the zoom lens of three lens groups With the third lens group from the object side being movable both for zooming and for focusing, the third lens group is moved continuously toward the object side during zooming toward the telephoto end so that the distance between the second lens group and the third lens group becomes small. Thus, little distance is left for assuring sufficient movement of the third lens group for focusing. Particularly, in short-distance photography, focusing movement becomes greater at the telephoto end than at the wide-angle end so that the focusing lens, which in this case is the third lens group, requires increased movement. That is, large movements are required at the telephoto end. Japanese Laid-Open Patent Application 2000-131610 operates differently with a zoom lens that includes four lens groups, but the use of the four lens groups limits miniaturization and reduction of the costs of the zoom lens.

BRIEF SUMMARY OF THE INVENTION

The present invention relates to a zoom optical system that is small, that has an inexpensive construction, that assures sufficient movement of the third lens group from the object side for focusing as desired, and that is capable of short-distance photography at the telephoto end.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 1A–1B show the cross-sectional views of the zoom optical system of Embodiment 1 at the wide-angle end and at the telephoto end, respectively;

FIGS. 2A–2D show the spherical aberration, astigmatism, distortion, and lateral color, respectively, of the zoom optical system of Embodiment 1 at the wide-angle end;

FIGS. 2E–2H show the spherical aberration, astigmatism, distortion, and lateral color, respectively, of the zoom optical system of Embodiment 1 at the telephoto end;

FIGS. 4A–4D show the spherical aberration, astigmatism, distortion, and lateral color, respectively, of the zoom optical system of Embodiment 2 at the wide-angle end; and FIGS. 4E–4H show the spherical aberration, astigmatism, distortion, and lateral color, respectively, of the zoom optical system of Embodiments 2 at the telephoto end.

DETAILED DESCRIPTION OF THE INVENTION

Figures 3A, 3B:
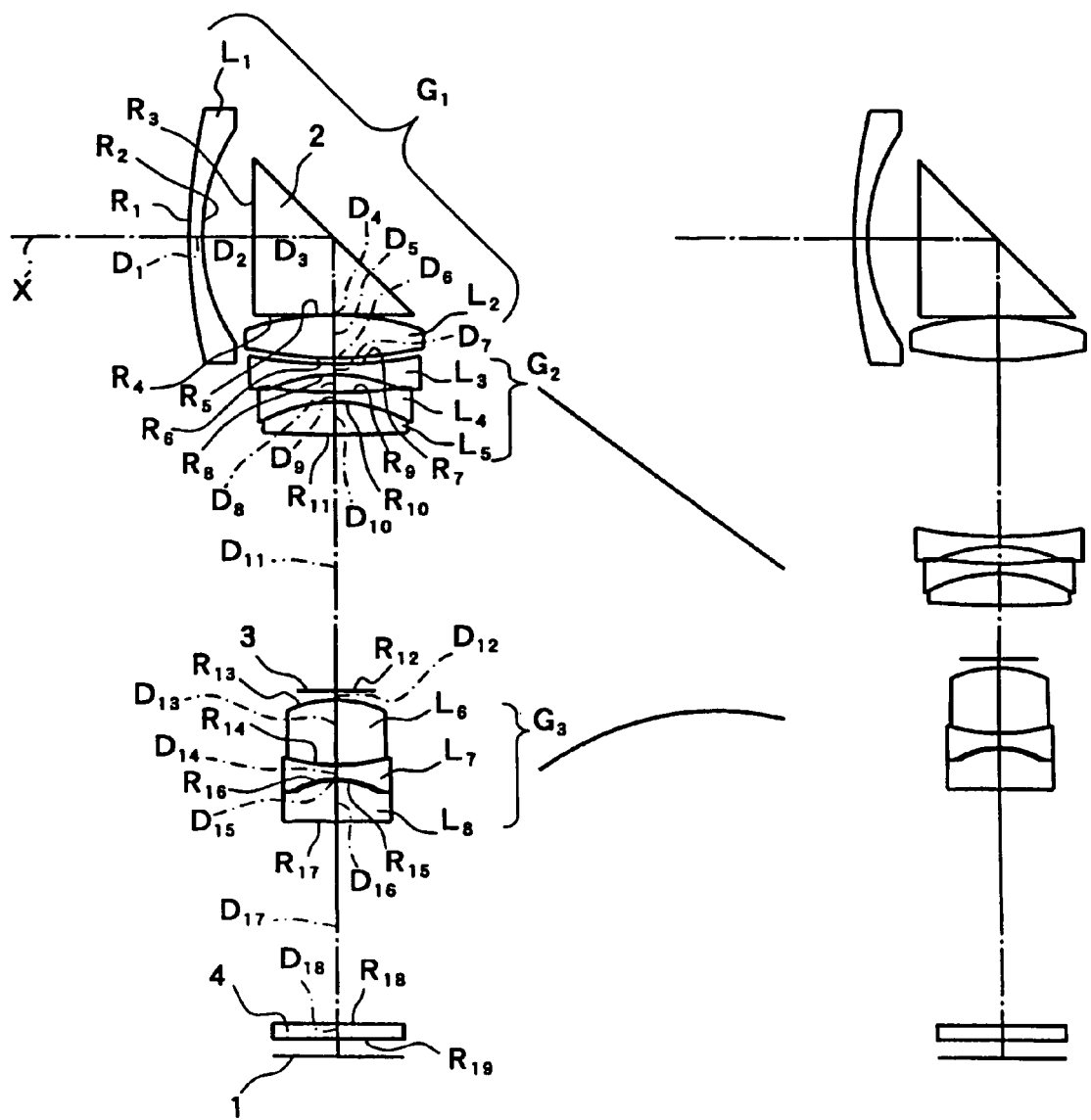
FIGS. 3A–3B show cross-sectional views of the zoom optical system of Embodiment 2 at the wide-angle end and at the telephoto end, respectively.

A general description of the zoom optical system of the present invention that pertains to disclosed embodiments of the invention will now be described with reference to FIGS. 1A–1B that show Embodiment 1. In FIG. 1A, the object side of the zoom optical system is at the left where the reference symbol X indicates the optical axis of the zoom optical system. The image pickup plane, indicated by reference symbol 1 in FIG. 1A, is on the image side of the zoom optical system. In FIG. 1A, lens elements are referenced by the letter L with a subscript number denoting their order from the object side of the zoom optical system along the optical axis X, from $L_1$ to $L_7$. Similarly, the radii of curvature of the optical surfaces are referenced by the letter R with a subscript number denoting their order from the object side of the zoom optical system, from $R_1$ to $R_{18}$. The on-axis surface spacings along the optical axis X of the various optical surfaces are referenced by the letter D with a subscript number denoting their order from the object side of the zoom optical system, from $D_1$ to $D_{17}$. In the same manner, three lens groups are labeled $G_1$, $G_2$, and $G_3$ in order from the object side of the zoom optical system, and the optical components belonging to each lens group are indicated by brackets adjacent the labels $G_1$, $G_2$, and $G_3$.

The term "lens group" is defined in terms of "lens elements" and "lens components" as explained herein. The term "lens element" is herein defined as a single transparent mass of refractive material having two opposed refracting surfaces, which surfaces are positioned at least generally transversely of the optical axis of the zoom optical system. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." The term "lens group" is herein defined as an assembly of one or more lens components in optical series and with no intervening lens components along an optical axis that during zooming is movable as a single unit relative to another lens component or other lens components.

The zoom optical system of the present invention includes, arranged in order from the object side, a first lens group $G_1$ having positive refractive power, a second lens group $G_2$ having negative refractive power, and a third lens group $G_3$ having positive refractive power.

A light beam incident along the optical axis X from the object side passes through lens groups $G_1$, $G_2$, and $G_3$ and is imaged on the image pickup plane 1 where an image pickup element, such as a CCD, is located. Moreover, a cover glass 4, which may also include a filter element, is arranged between the third lens group $G_3$ and the image pickup plane 1.

While FIG. 1A shows the positions of lens groups $G_1$, $G_2$, and $G_3$ at the wide-angle end, lines adjacent reference symbols $G_2$ and $G_3$ indicate the locus of points of movement of lens groups $G_2$ and $G_3$ along the optical axis X during zooming from the wide-angle end to the telephoto end, with FIG. 1B showing the positions of the lens groups at the telephoto end. The straight line adjacent reference symbol $G_2$ indicates that lens group $G_2$ moves continuously toward the image side during zooming from the wide-angle end to the telephoto end. The line adjacent reference symbol $G_3$ is convex upward, that is, convex toward the object side, and indicates that the third lens group $G_3$ moves first toward the object side and then back toward the image side during zooming from the wide-angle end to the telephoto end. The second lens group $G_2$ and the third lens group $G_3$ generally become closer together during zooming from the wide-angle end to the telephoto end, and the movements enable the third lens group $G_3$ having positive refractive power to move properly also for focusing adjustment, simplifying the construction and movements required so that costs can be reduced and particularly enabling short-distance photography at the telephoto end.

As shown in FIG. 1A, the first lens group $G_1$ includes, arranged in order from the object side, a first lens element $L_1$ having negative refractive power, a prism 2 for bending the optical axis, and a second lens element $L_2$ having positive refractive power. Miniaturization and cost reduction can be achieved by arranging at least one lens element having negative refractive power on the object side of the prism 2 so as to decrease the diameter of the light beam to the prism 2 and thus reduce the required size of the prism 2. It is preferable that a lens element having positive refractive power of the first lens group $G_1$ include an aspheric surface, and when an aspheric lens element is used as the second lens element $L_2$, field curvature and distortion can be well corrected.

The second lens group $G_2$ includes, arranged in order from the object side, a biconcave third lens element $L_3$ and a fourth lens element $L_4$ having positive refractive power.

The third lens group $G_3$ includes, arranged in order from the object side, a stop 3, a lens component that includes a fifth lens element $L_5$ having positive refractive power that is cemented on its image side to a sixth lens element $L_6$ having negative refractive power, and another lens component that is a lens element $L_7$. It is preferable that the third lens group $G_3$ include a stop, shown as stop 3 in FIG. 1A, for controlling the amount of light that passes through the zoom optical system. The axial chromic aberration and the lateral color can be corrected by such a construction, and the spherical aberration and field curvature can be corrected by having the separate lens element $L_7$ include at least one aspheric surface. Moreover, because it is easy to form the aspheric lens element, lens element $L_7$, and the cemented lens elements $L_5$ and $L_6$ so that their opposed surfaces properly connect by forming the aspheric lens element of plastic, the suppression of eccentricity within the third lens group $G_3$ and the stabilization of image quality of the entire zoom optical system can thus be achieved.

The lens surface or surfaces that are aspheric are defined using the following equation:

$$Z=[(Y^2/R)/\{1+(1-K\cdot Y^2/R^2)^{1/2}\}]+\Sigma(A_i\cdot Y^i) \qquad \text{Equation (A)}$$

where

Z is the length (in mm) of a line drawn from a point on the aspheric lens surface at a distance Y from the optical axis to the tangential plane of the aspheric surface vertex, R is the radius of curvature (in mm) of the aspheric lens surface on the optical axis, Y is the distance (in mm) from the optical axis, K is the eccentricity, and $A_i$ is the ith aspheric coefficient, and the summation extends over i.

In embodiments of the invention disclosed below, only aspheric coefficients $A_3$–$A_{12}$ are non-zero.

It is preferable that the zoom optical system of the present invention satisfies the following Condition (1):

$$0<(Lm-Lt)/Fw<0.2 \qquad \text{Condition (1)}$$

where

Lm is the distance along the optical axis X from the vertex of the most object-side lens surface of the third lens group $G_3$ to the image surface when the third lens group $G_3$ is nearest the object side during zooming;

Lt is the distance along the optical axis X from the vertex of the most object-side lens surface of the third lens group $G_3$ to the image surface at the telephoto end of the zoom range; and Fw is the focal length of the zoom optical system at the wide-angle end of the zoom range.

Condition (1) above relates to the movement of the third lens group $G_3$ during zooming, enables short-distance photography at the telephoto end, and further increases the light-receiving efficiency of a CCD image pickup element by Condition (1) being satisfied. If the upper limit of Condition (1) is not satisfied, the third lens group $G_3$ comes too close to the image side and the exit angle of light rays passing to the CCD increases, reducing the light-receiving efficiency of the CCD. On the other hand, if the lower limit of Condition (1) is not satisfied, the distance between the second lens group $G_2$ and the third lens group $G_3$ becomes too small during zooming, and the amount of movement of the third lens group $G_3$ required for focusing cannot be ensured, particularly making short-distance photography difficult.

Two embodiments of the present invention will now be individually described with reference to the drawings.

Embodiment 1

FIGS. 1A–1B show cross-sectional views of the zoom optical system of Embodiment 1 at the wide-angle end and at the telephoto end, respectively. As shown in FIG. 1A, the zoom optical system of Embodiment 1 includes, arranged in order from the object side, a first lens group $G_1$ having positive refractive power, a second lens group $G_2$ having negative refractive power, and a third lens group $G_3$ having positive refractive power. The straight line adjacent reference symbol $G_2$ and the convex upward line adjacent reference symbol $G_3$ taken together indicate that as the second lens group $G_2$ moves at a constant speed along the optical axis X between the wide-angle end shown in FIG. 1A and the telephoto end shown in FIG. 1B, the third lens group $G_3$ moves at a varying speed along the optical axis X.

In Embodiment 1, the first lens group $G_1$ includes, arranged in order from the object side, a first lens element $L_1$ having negative refractive power, a meniscus shape, and a convex surface on the object side, a prism for bending the optical axis, and a second lens element $L_2$ having a biconvex shape with two aspheric surfaces.

The second lens group $G_2$ includes, arranged in order from the object side, a third lens element $L_3$ having a biconcave shape with two aspheric surfaces and a fourth lens element $L_4$ having positive refractive power, a meniscus shape, and a convex surface on the object side.

The third lens group $G_3$ includes, arranged in order from the object side, a fifth lens element $L_5$ having a biconvex shape, a sixth lens element $L_6$ having a biconcave shape, and a seventh lens element $L_7$ having a biconvex shape with two aspheric surfaces.

Table 1 below lists the surface number # (the stop 3 defining the eleventh surface), in order from the object side, the radius of curvature R (in mm) of each surface on the optical axis, the on-axis surface spacing D (in mm) except that the on-axis surface spacings that vary with zooming are listed in Table 3 below, as well as the refractive index $N_d$ and the Abbe number $v_d$ at the d-line (587.6 nm) of each optical element for Embodiment 1. Note that although R is the on-axis radius of curvature, for convenience of illustration, in FIG. 1A the lead lines from the R reference symbols extend to the surfaces being referenced but do not extend to the on-axis positions. Listed in the bottom portion of Table 1 are the focal length f and the f-number $F_{NO}$ at the wide-angle and telephoto ends, and the maximum field angle 2ω at the wide-angle end and at the telephoto end for Embodiment 1. Tables similar to those for Embodiment 1 below will be used later to describe Embodiment 2 of the present invention.

TABLE 1

| # | R | D | $N_d$ | $v_d$ |
|---|---|---|---|---|
| 1 | 40.7061 | 0.75 | 1.80518 | 25.4 |
| 2 | 11.0003 | 2.73 | | |
| 3 | ∞ | 8.90 | 1.78590 | 44.2 |
| 4 | ∞ | 0.05 | | |
| 5* | 15.5556 | 2.51 | 1.58809 | 60.4 |
| 6* | −17.4293 | $D_6$ (variable) | | |
| 7* | −20.0619 | 0.80 | 1.80348 | 40.4 |
| 8* | 6.2807 | 1.06 | | |
| 9 | 9.0982 | 1.70 | 1.92286 | 18.9 |
| 10 | 25.2351 | $D_{10}$ (variable) | | |
| 11 (stop) | ∞ | 0.50 | | |
| 12 | 5.8040 | 3.71 | 1.84666 | 23.8 |
| 13 | −5.8040 | 0.80 | 1.92286 | 18.9 |
| 14 | 4.9013 | 0.20 | | |
| 15* | 5.4510 | 2.30 | 1.51007 | 56.2 |
| 16* | −29.9187 | $D_{16}$ (variable) | | |
| 17 | ∞ | 0.85 | 1.51680 | 64.2 |
| 18 | ∞ | | | |
| f = 6.67–18.85 $F_{NO}$ = 4.53–5.10 2ω = 60.4°–21.4° | | | | |

The lens surfaces with a * to the right of the surface number in Table 1 are aspheric lens surfaces.

Table 2 below lists the values of the constant K and the coefficients $A_3$–$A_{12}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E−2" represents the number $1.0 \times 10^{-2}$.

TABLE 2

| # | K | $A_3$ | $A_4$ | $A_5$ |
|---|---|---|---|---|
| 5 | 1.4912069 | 3.9208178E-5 | 2.7667705E-5 | −4.9563963E-5 |
| 6 | −4.5561462 | 1.6307361E-4 | −9.9910950E-5 | −1.6903019E-5 |
| 7 | −97.5840668 | 8.5228393E-4 | −1.2350851E-3 | 1.3308189E-4 |
| 8 | 1.4976842 | 4.5258735E-4 | 5.1896427E-4 | −5.5754680E-4 |
| 15 | 5.0948807 | −5.9417278E-4 | −1.6108152E-3 | −2.9546806E-3 |
| 16 | −9.9915499 | −2.1756999E-4 | 1.3341972E-3 | 6.7729418E-5 |

| # | $A_6$ | $A_7$ | $A_8$ | $A_9$ |
|---|---|---|---|---|
| 5 | 7.1616506E-6 | −8.0528622E-7 | 3.0010886E-8 | 1.4064101E-8 |
| 6 | −8.0880629E-7 | 2.2953182E-7 | 1.3608465E-7 | −4.7668751E-9 |
| 7 | −1.8120603E-5 | 7.2991718E-6 | 3.7584936E-7 | −3.3012359E-7 |
| 8 | 5.0146003E-5 | −5.2337496E-6 | 3.7703741E-6 | −2.6762316E-7 |
| 15 | 1.0591787E-3 | 8.2889684E-5 | −1.5877049E-4 | −8.6534314E-5 |
| 16 | −3.5289965E-4 | 8.2617933E-5 | 8.9294154E-5 | 8.4040112E-6 |

| # | $A_{10}$ | $A_{11}$ | $A_{12}$ |
|---|---|---|---|
| 5 | 2.2801412E-10 | −1.3713204E-10 | −8.6099389E-11 |
| 6 | −2.4602899E-9 | −2.9444038E-10 | 4.8229839E-12 |
| 7 | 2.3419032E-8 | 0 | 0 |
| 8 | −9.0003768E-8 | 0 | 0 |
| 15 | −8.2764803E-6 | 4.9781809E-5 | −1.5962419E-5 |
| 16 | −2.1462606E-5 | −6.5522234E-6 | 3.7610168E-6 |

In the zoom optical system of Embodiment 1, lens groups $G_2$ and $G_3$ move along the optical axis during zooming to vary the separations of the three lens groups in order to provide a zoom ratio of about three. Therefore, the values of the on-axis spacings $D_6$, $D_{10}$, and $D_{16}$ vary. Table 3 below lists the values of the variables $D_6$, $D_{10}$, and $D_{16}$ (i.e., the group spacings) at the wide-angle end, at the middle position at which the third lens group $G_3$ reaches its object-most position, and at the telephoto end with the zoom optical system focused at infinity.

TABLE 3

| Focal Length f (mm) | $D_6$ | $D_{10}$ | $D_{16}$ |
|---|---|---|---|
| 6.67 | 0.35 | 15.40 | 12.45 |
| 16.47 | 8.39 | 4.64 | 15.17 |
| 18.85 | 10.26 | 3.30 | 14.64 |

Embodiment 1 satisfies Condition (1) above with a value of (Lm−Lt)/Fw of 0.079. The entire length of the zoom optical system is 55.06 mm.

FIGS. 2A–2D show the spherical aberration, astigmatism, distortion, and lateral color, respectively, of the zoom optical system of Embodiment 1 at the wide-angle end. FIGS. 2E–2H show the spherical aberration, astigmatism, distortion, and lateral color, respectively, of the zoom optical system of Embodiment 1 at the telephoto end. In FIGS. 2A and 2E, the spherical aberration (in mm) is shown for the wavelengths 587.6 nm (the d-line), 460 nm, and 615 nm, and the f-number (F/) is shown. In the remaining figures, ω is the half-field angle. In FIGS. 2B and 2F, the astigmatism (in mm) is shown for both the sagittal image surface S (solid line) and the tangential image surface T (broken line) and is measured at 587.6 nm (the d-line). In FIGS. 2C and 2G, distortion (in percent) is measured at 587.6 nm (the d-line). In FIGS. 2D and 2H, the lateral color (in μm) is shown for the wavelengths 460 nm and 615 nm relative to 587.6 nm (the d-line).

As is evident from FIGS. 2A–2H and from the numerical data in the tables above, aberrations are extremely well corrected in Embodiment 1 of the present invention.

Embodiment 2

FIGS. 3A–3B show cross-sectional views of the zoom optical system of Embodiment 2 at the wide-angle end and at the telephoto end, respectively. Embodiment 2 is similar to Embodiment 1 and therefore only the differences between Embodiment 2 and Embodiment 1 will be explained. Embodiment 2 differs from Embodiment 1 in having a third lens element in the second lens group $G_2$, which becomes the fifth lens element $L_5$ as counted from the object side of the zoom optical system. Embodiment 2 also differs from Embodiment 1 in its lens element configuration by having different radii of curvature of the lens surfaces, different aspheric coefficients of the aspheric lens surfaces, different optical element surface spacings, and some different refractive indexes and Abbe numbers.

The second lens group $G_2$ includes, arranged in order from the object side, a third lens element $L_3$ having a biconcave shape and a lens component formed of a fourth lens element $L_4$ having a biconcave shape that is cemented to the fifth lens element $L_5$ that has a biconvex shape.

A main difference of Embodiment 2 from Embodiment 1 is that the second lens group $G_2$ includes three lens elements, rather than two, and two of the three lens elements are cemented together. Lateral color is particularly further improved by having a cemented lens component in the second lens group $G_2$.

Table 4 below lists the surface number # (the stop 3 defining the twelfth lens surface), in order from the object side, the radius of curvature R (in mm) of each surface on the optical axis, the on-axis surface spacing D (in mm) except that the on-axis surface spacings that vary with zooming are listed in Table 6 below, as well as the refractive index $N_d$ and the Abbe number $v_d$ at the d-line (587.6 nm) of each optical element for Embodiment 2. Note that although R is the on-axis radius of curvature, for convenience of illustration, in FIG. 3A the lead lines from the R reference symbols extend to the surfaces being referenced but do not extend to the on-axis positions. Listed in the bottom portion of Table 4 are the focal length f and the f-number $F_{NO}$ at the wide-angle and telephoto ends, and the maximum field angle 2ω at the wide-angle end and at the telephoto end for Embodiment 2.

TABLE 4

| # | R | D | $N_d$ | $v_d$ |
|---|---|---|---|---|
| 1 | 30.7982 | 0.75 | 1.80518 | 25.4 |
| 2 | 11.0001 | 2.90 | | |
| 3 | ∞ | 8.90 | 1.78590 | 44.2 |
| 4 | ∞ | 0.05 | | |
| 5* | 15.0026 | 2.46 | 1.58809 | 60.4 |
| 6* | −19.2166 | $D_6$ (variable) | | |
| 7 | −24.3926 | 0.58 | 1.83400 | 37.2 |
| 8 | 8.4442 | 1.00 | | |
| 9 | −23.7783 | 0.56 | 1.54814 | 45.8 |
| 10 | 8.3462 | 1.84 | 1.84666 | 23.8 |
| 11 | −58.4469 | $D_{11}$ (variable) | | |
| 12 (stop) | ∞ | 0.50 | | |
| 13 | 6.3023 | 3.71 | 1.84666 | 23.8 |
| 14 | −10.2514 | 0.80 | 1.92286 | 18.9 |
| 15 | 4.8588 | 0.10 | | |
| 16* | 4.3969 | 2.30 | 1.51007 | 56.2 |
| 17* | −50.7759 | $D_{17}$ (variable) | | |
| 18 | ∞ | 0.85 | 1.51680 | 64.2 |
| 19 | ∞ | | | |
| f = 6.66–18.85 | $F_{NO}$ = 4.47–5.01 | 2ω = 60.6°–21.2° | | |

The lens surfaces with a * to the right of the surface number in Table 4 are aspheric lens surfaces.

Table 5 below lists the values of the constant K and the coefficients $A_3$–$A_{12}$ used in Equation (A) above for each of the aspheric lens surfaces of Table 4. Aspheric coefficients that are not present in Table 5 are zero. An "E" in the data indicates that the number following the "E" is the exponent to the base 10. For example, "1.0E−2" represents the number $1.0 \times 10^{-2}$.

TABLE 5

| # | K | $A_3$ | $A_4$ | $A_5$ |
|---|---|---|---|---|
| 5 | 2.8205941 | −1.4202532E−4 | 7.1781566E−5 | −8.6863684E−5 |
| 6 | −1.4760056 | 7.3141867E−5 | −1.4716244E−4 | 2.9762562E−5 |
| 16 | 3.2382971 | −2.2404145E−3 | 1.7562041E−3 | −5.6192401E−3 |
| 17 | 5.1685197 | −9.9917874E−4 | 2.5854806E−3 | 4.4154191E−4 |

| # | $A_6$ | $A_7$ | $A_8$ | $A_9$ |
|---|---|---|---|---|
| 5 | 1.4145887E−5 | 9.1188743E−7 | 4.6872439E−8 | −2.5387916E−8 |
| 6 | 1.9800893E−6 | 4.0357352E−7 | 5.8136643E−8 | −2.4487058E−8 |
| 16 | 2.1588192E−3 | 8.6049096E−6 | −2.6483992E−4 | −7.9361455E−5 |
| 17 | −4.0786940E−4 | −6.0627627E−5 | 6.7449820E−5 | 5.2708384E−5 |

| # | $A_{10}$ | $A_{11}$ | $A_{12}$ |
|---|---|---|---|
| 5 | −1.0398101E−8 | −1.1495803E−9 | 5.8358231E−10 |
| 6 | −5.9287218E−9 | −4.8049945E−10 | 4.4091685E−10 |
| 16 | −4.8978953E−6 | 6.6130382E−5 | −2.2273502E−5 |
| 17 | 5.3740206E−6 | −2.4370307E−5 | 5.8671554E−6 |

In the zoom optical system of Embodiment 2, lens groups $G_2$ and $G_3$ move along the optical axis during zooming to vary the separations of the three lens groups in order to provide a zoom ratio of about three. Therefore, the values of the on-axis spacings $D_6$, $D_{11}$, and $D_{17}$ vary. Table 6 below lists the values of the variables $D_6$, $D_{11}$, and $D_{17}$ (i.e., the group spacings) at the wide-angle end, at the middle position at which the third lens group $G_3$ reaches its most object-side position, and at the telephoto end with the zoom optical system focused at infinity.

TABLE 6

| Focal Length f (mm) | $D_6$ | $D_{11}$ | $D_{17}$ |
|---|---|---|---|
| 6.66 | 0.35 | 14.74 | 12.68 |
| 16.26 | 8.04 | 4.46 | 15.27 |
| 18.85 | 10.07 | 3.10 | 14.60 |

Embodiment 2 satisfies Condition (1) above with a value of (Lm−Lt)/Fw of 0.101. The entire length of the zoom optical system is 55.07 mm.

FIGS. 4A–4D show the spherical aberration, astigmatism, distortion, and lateral color, respectively, of the zoom optical system of Embodiment 2 at the wide-angle end. FIGS. 4E–4H show the spherical aberration, astigmatism, distortion, and lateral color, respectively, of the zoom optical system of Embodiment 2 at the telephoto end. In FIGS. 4A and 4E, the spherical aberration (in mm) is shown for the wavelengths 587.6 nm (the d-line), 460 nm, and 615 nm, and the f-number (F/) is shown. In the remaining figures, ω is the half-field angle. In FIGS. 4B and 4F, the astigmatism (in mm) is shown for both the sagittal image surface S (solid line) and the tangential image surface T (broken line) and is measured at 587.6 nm (the d-line). In FIGS. 4C and 4G, distortion (in percent) is measured at 587.6 nm (the d-line). In FIGS. 4D and 4H, the lateral color (in μm) is shown for the wavelengths 460 nm and 615 nm relative to 587.6 nm (the d-line).

As is evident from FIGS. 4A–4H and from the numerical data in the tables above, aberrations, especially lateral color, are well corrected in Embodiment 2 of the present invention.

The zoom optical system of the present invention being thus described, it will be obvious that the same may be varied in many ways. For instance, values such as the radius of curvature R of each of the lens elements, the surface spacing D, the refractive index $N_d$, as well as the Abbe number $v_d$, are not limited to the examples indicated in each of the aforementioned embodiments, as other values can be adopted. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom optical system having an object side and an image side and comprising, arranged along an optical axis in order from the object side as follows:
    a first lens group having positive refractive power that includes a prism for bending the optical axis and at least one lens element having positive refractive power;
    a second lens group having negative refractive power; and
    a third lens group having positive refractive power; wherein
    said second lens group and said third lens group move along the optical axis during zooming and said third lens group moves along the optical axis toward the object side and then toward the image side during zooming from the wide-angle end to the telephoto end.

2. The zoom optical system of claim 1, wherein the zoom optical system includes an image surface on the image side and the following condition is satisfied:

$$0 < (Lm - Lt)/Fw < 0.2$$

where
    Lm is the distance along the optical axis from the vertex of the most object-side lens surface of the third lens group to the image surface when the third lens group is nearest the object side during zooming;
    Lt is the distance along the optical axis from the vertex of the most object-side lens surface of the third lens group to the image surface at the telephoto end of the zoom range; and
    Fw is the focal length of the zoom optical system at the wide-angle end of the zoom range.

3. The zoom optical system of claim 1, wherein said third lens group includes a stop for controlling the amount of light that passes through the zoom optical system.

4. The zoom optical system of claim 2, wherein said third lens group includes a stop for controlling the amount of light that passes through the zoom optical system.

5. The zoom optical system of claim 1, wherein said first lens group includes, arranged along the optical axis in order from the object side as follows:
    a lens element having negative refractive power;
    a prism; and
    said lens element having positive refractive power.

6. The zoom optical system of claim 2, wherein said first lens group includes, arranged along the optical axis in order from the object side as follows:
    a lens element having negative refractive power;
    a prism; and
    said lens element having positive refractive power.

7. The zoom optical system of claim 3, wherein said first lens group includes, arranged along the optical axis in order from the object side as follows:
    a lens element having negative refractive power;
    a prism; and
    said lens element having positive refractive power.

8. The zoom optical system of claim 5, wherein said lens element having positive refractive power includes at least one aspheric surface.

9. The zoom optical system of claim 6, wherein said lens element having positive refractive power includes at least one aspheric surface.

10. The zoom optical system of claim 7, wherein said lens element having positive refractive power includes at least one aspheric surface.

11. The zoom optical system of claim 1, wherein said third lens group comprises:
    a first lens component that includes a lens element having positive refractive power that is cemented on its image side to a lens element having negative refractive power; and
    a second lens component that is a lens element and that is on the image side of said first lens component.

12. The zoom optical system of claim 2, wherein said third lens group comprises:
    a first lens component that includes a lens element having positive refractive power that is cemented on its image side to a lens element having negative refractive power; and
    a second lens component that is a lens element and that is on the image side of said first lens component.

13. The zoom optical system of claim 3, wherein said third lens group comprises:
    a first lens component that includes a lens element having positive refractive power that is cemented on its image side to a lens element having negative refractive power; and
    a second lens component that is a lens element and that is on the image side of said first lens component.

14. The zoom optical system of claim 5, wherein said third lens group comprises:
    a first lens component that includes a lens element having positive refractive power that is cemented on its image side to a lens element having negative refractive power; and
    a second lens component that is a lens element and that is on the image side of said first lens component.

15. The zoom optical system of claim 8, wherein said third lens group comprises:
    a first lens component that includes a lens element having positive refractive power that is cemented on its image side to a lens element having negative refractive power; and
    a second lens component that is a lens element and that is on the image side of said first lens component.

16. The zoom optical system of claim 11, wherein at least one surface of said second lens component is an aspheric surface.

17. The zoom optical system of claim 12, wherein at least one surface of said second lens component is an aspheric surface.

18. The zoom optical system of claim 16, wherein said second lens component is made of plastic.

19. The zoom optical system of claim 17, wherein said second lens component is made of plastic.

* * * * *

UNITED STATES PATENT AND TRADEMARK OFFICE
CERTIFICATE OF CORRECTION

PATENT NO. : 7,180,684 B1  Page 1 of 1
APPLICATION NO. : 11/492084
DATED : February 20, 2007
INVENTOR(S) : Ori It is certified that error appears in the above-identified patent and that said Letters Patent is hereby corrected as shown below:

Column 1
Line 31, change "groups With" to -- groups with --.

Signed and Sealed this

Seventeenth Day of April, 2007

JON W. DUDAS
*Director of the United States Patent and Trademark Office*